(12) United States Patent
Sugaya

(10) Patent No.: US 10,389,947 B2
(45) Date of Patent: Aug. 20, 2019

(54) OMNIDIRECTIONAL CAMERA DISPLAY IMAGE CHANGING SYSTEM, OMNIDIRECTIONAL CAMERA DISPLAY IMAGE CHANGING METHOD, AND PROGRAM

(71) Applicant: OPTiM Corporation, Saga-shi (JP)

(72) Inventor: Shunji Sugaya, Tokyo (JP)

(73) Assignee: OPTIM CORPORATION, Saga-Shi (JP)

(*) Notice: Subject to any disclaimer, the term of this patent is extended or adjusted under 35 U.S.C. 154(b) by 0 days.

(21) Appl. No.: 16/059,151

(22) Filed: Aug. 9, 2018

(65) Prior Publication Data

US 2018/0352168 A1 Dec. 6, 2018

Related U.S. Application Data

(63) Continuation-in-part of application No. PCT/JP2016/061847, filed on Apr. 12, 2016.

(51) Int. Cl.
| | | |
|---|---|---|
| *H04N 5/232* | (2006.01) | |
| *G06K 9/00* | (2006.01) | |
| *G06K 9/32* | (2006.01) | |
| *G10L 25/78* | (2013.01) | |
| *G10L 21/0208* | (2013.01) | |
| *G06K 9/20* | (2006.01) | |

(52) U.S. Cl.
CPC ... *H04N 5/232939* (2018.08); *G06K 9/00335* (2013.01); *G06K 9/00342* (2013.01); *G06K 9/32* (2013.01); *G10L 21/0208* (2013.01); *H04N 5/23216* (2013.01); *H04N 5/23238* (2013.01); *H04N 5/232127* (2018.08); *H04N 5/232935* (2018.08); *G06K 9/2018* (2013.01); *G10L 25/78* (2013.01)

(58) Field of Classification Search
CPC combination set(s) only.
See application file for complete search history.

(56) References Cited

U.S. PATENT DOCUMENTS

| | | | |
|---|---|---|---|
| 2003/0179288 | A1* | 9/2003 | Jones ........ F41H 11/00 348/43 |
| 2016/0080650 | A1 | 3/2016 | Okazawa et al. |
| 2017/0111595 | A1* | 4/2017 | Soni ........ H04L 65/4092 |

FOREIGN PATENT DOCUMENTS

| | | |
|---|---|---|
| JP | 2004-336508 | 11/2004 |
| JP | 2010-199728 | 9/2010 |
| JP | 2013-98965 | 5/2013 |
| JP | 2014-220723 | 11/2014 |
| JP | 2015-230625 | 12/2015 |
| JP | 2016-48856 | 4/2016 |

* cited by examiner

*Primary Examiner* — Paul M Berardesca
(74) *Attorney, Agent, or Firm* — Lex IP Meister, PLLC

(57) ABSTRACT

An omnidirectional camera display image changing system, an omnidirectional camera display image changing method, and a program for improving the convenience is provided. An omnidirectional camera display image changing system 1 for displaying a captured image captured by an omnidirectional camera on a connected display detects a line of sight of a subject captured by the omnidirectional camera, and in a case where a detection has been made, changes a display image so that the subject is displayed in a vicinity of a center of the display.

4 Claims, 7 Drawing Sheets

OMNIDIRECTIONAL CAMERA DISPLAY IMAGE CHANGING SYSTEM, OMNIDIRECTIONAL CAMERA DISPLAY IMAGE CHANGING METHOD, AND PROGRAM

CROSS-REFERENCE TO RELATED APPLICATION

This application is a continuation-in-part of PCT Application No. PCT/JP2016/061847 filed on Apr. 12, 2016, the entire contents of which are incorporated herein by reference.

BACKGROUND

(a) Field

The present invention relates to an omnidirectional camera display image changing system, an omnidirectional camera display image changing method, and a program for displaying a captured image captured by an omnidirectional camera on a connected display.

(b) Description of the Related Art

In recent years, an omnidirectional camera capable of capturing 360-degree panoramic images in all directions of up, down, left, and right has been proposed. In such an omnidirectional camera, in order to image the entire visual field, it is possible to capture an omnidirectional image by an image capturing device which uses a plurality of cameras as one device or an image capturing device having a plurality of special lenses and to display a 360-degree panoramic image as a display image. In such a display image, the user can change a display position by inputting a desired place by an operation input.

As such a configuration, a configuration is disclosed in which a display center of a display image to be displayed on a display device is changed based on a user's operation input such as a touch panel operation, a mouse operation or the like and the changed image is displayed (see Japanese Patent Application Publication No. 2015-230625 (hereinafter referred to as "'625 publication").

However, in the configuration of '625 publication, since it is necessary to perform an operation input in order to view a display image of a place desired by the user, many operation inputs should be performed in order to display the place desired by the user. As such, there is a technical problem in the existing technology related to the display image changing that the convenience of the display image changing system is low because many operation inputs should be performed in order to display the place desired by the user.

SUMMARY

An aspect of the present invention provides an omnidirectional camera display image changing system, an omnidirectional camera display image changing method, and a program for improving the convenience.

A first aspect of the present invention provides an omnidirectional camera display image changing system for displaying a captured image captured by an omnidirectional camera on a connected display, the omnidirectional camera display image changing system including a line-of-sight detecting unit that detects a line of sight of a subject captured by the omnidirectional camera, and a display image changing unit that, in a case where a detection has been made, changes a display image so that the subject is displayed in a vicinity of a center of the display.

According to the first aspect of the present invention, an omnidirectional camera display image changing system for displaying a captured image captured by an omnidirectional camera on a connected display, detects a line of sight of a subject captured by the omnidirectional camera, and in a case where a detection has been made, changes a display image so that the subject is displayed in a vicinity of a center of the display.

The invention according to the first aspect is a category of an omnidirectional camera display image changing system, but exhibits the same action and effect corresponding to the category even in other categories such as a method, a program, and the like.

A second aspect of the present invention provides an omnidirectional camera display image changing system for displaying a captured image captured by an omnidirectional camera on a connected display, the omnidirectional camera display image changing system including a motion detecting unit that detects a motion of a subject captured by the omnidirectional camera, and a display image changing unit that, in a case where a detection has been made, changes a display image so that the subject is displayed in a vicinity of a center of the display.

According to the second aspect of the present invention, an omnidirectional camera display image changing system for displaying a captured image captured by an omnidirectional camera on a connected display, detects a motion of a subject captured by the omnidirectional camera, and in a case where a detection has been made, changes a display image so that the subject is displayed in a vicinity of a center of the display.

The invention according to the second aspect is a category of an omnidirectional camera display image changing system, but exhibits the same action and effect corresponding to the category even in other categories such as a method, a program, and the like.

A third aspect of the present invention provides an omnidirectional camera display image changing system for displaying a captured image captured by an omnidirectional camera on a connected display, the omnidirectional camera display image changing system including a voice detecting unit that detects a voice of a subject captured by the omnidirectional camera, and a display image changing unit that, in a case where a detection has been made, changes a display image so that the subject is displayed in a vicinity of a center of the display.

According to the third aspect of the present invention, an omnidirectional camera display image changing system for displaying a captured image captured by an omnidirectional camera on a connected display, detects a voice of a subject captured by the omnidirectional camera, and in a case where a detection has been made, changes a display image so that the subject is displayed in a vicinity of a center of the display.

The invention according to the third aspect is a category of an omnidirectional camera display image changing system, but exhibits the same action and effect corresponding to the category even in other categories such as a method, a program, and the like.

A fourth aspect of the present invention provides the omnidirectional camera display image changing system, which is the invention according to any one of the first to third aspects, further including a focal changing unit that adjusts focus of the omnidirectional camera on the subject appearing in the changed display image.

According to the fourth aspect of the present invention, the omnidirectional camera display image changing system, which is the invention according to any one of the first to third aspects, adjusts focus of the omnidirectional camera on the subject appearing in the changed display image.

A fifth aspect of the present invention provides the omnidirectional camera display image changing system, which is the invention according to any one of the first to third aspects, wherein the display image changing unit rotates the captured image of the omnidirectional camera to change the display image.

According to the fifth aspect of the present invention, the omnidirectional camera display image changing system, which is the invention according to any one of the first to third aspects, rotates the captured image of the omnidirectional camera to change the display image.

A sixth aspect of the present invention provides the omnidirectional camera display image changing system, which is the invention according to any one of the first to third aspects, wherein the detecting unit determines that the detection has been made when a detected value exceeds a threshold value.

According to the sixth aspect of the present invention, the omnidirectional camera display image changing system, which is the invention according to any one of the first to third aspects, determines that the detection has been made when a detected value exceeds a threshold value.

A seventh aspect of the present invention provides the omnidirectional camera display image changing system, which is the invention according to the first aspect, wherein the display image changing unit changes the display image so that an eye of the subject is displayed in the vicinity of the center of the display.

According to the seventh aspect of the present invention, the omnidirectional camera display image changing system, which is the invention according to the first aspect, changes the display image so that an eye of the subject is displayed in the vicinity of the center of the display.

An eighth aspect of the present invention provides the omnidirectional camera display image changing system, which is the invention according to the second aspect, wherein the display image changing unit changes the display image so that a moving portion of the subject is displayed in the vicinity of the center of the display.

According to the eighth aspect of the present invention, the omnidirectional camera display image changing system, which is the invention according to the second aspect, changes the display image so that a moving portion of the subject is displayed in the vicinity of the center of the display.

A ninth aspect of the present invention provides the omnidirectional camera display image changing system, which is the invention according to the third aspect, wherein the display image changing unit changes the display image so that a mouth of the subject is displayed in the vicinity of the center of the display.

According to the ninth aspect of the present invention, the omnidirectional camera display image changing system, which is the invention according to the third aspect, changes the display image so that a mouth of the subject is displayed in the vicinity of the center of the display.

A tenth aspect of the present invention provides an omnidirectional camera display image changing method for displaying a captured image captured by an omnidirectional camera on a connected display, the omnidirectional camera display image changing method including detecting a line of sight of a subject captured by the omnidirectional camera, and in a case where a detection has been made, changing a display image so that the subject is displayed in a vicinity of a center of the display.

An eleventh aspect of the present invention provides an omnidirectional camera display image changing method for displaying a captured image captured by an omnidirectional camera on a connected display, the omnidirectional camera display image changing method including detecting a motion of a subject captured by the omnidirectional camera, and in a case where a detection has been made, changing a display image so that the subject is displayed in a vicinity of a center of the display.

A twelfth aspect of the present invention provides an omnidirectional camera display image changing method for displaying a captured image captured by an omnidirectional camera on a connected display, the omnidirectional camera display image changing method including detecting a voice of a subject captured by the omnidirectional camera, and in a case where a detection has been made, changing a display image so that the subject is displayed in a vicinity of a center of the display.

A thirteenth aspect of the present invention provides a program for causing an omnidirectional camera display image changing system for displaying a captured image captured by an omnidirectional camera on a connected display to execute detecting a line of sight of a subject captured by the omnidirectional camera, and in a case where a detection has been made, changing a display image so that the subject is displayed in a vicinity of a center of the display.

A fourteenth aspect of the present invention provides a program for causing an omnidirectional camera display image changing system for displaying a captured image captured by an omnidirectional camera on a connected display to execute detecting a motion of a subject captured by the omnidirectional camera, and in a case where a detection has been made, changing a display image so that the subject is displayed in a vicinity of a center of the display.

A fifteenth aspect of the present invention provides a program for causing an omnidirectional camera display image changing system for displaying a captured image captured by an omnidirectional camera on a connected display to execute detecting a voice of a subject captured by the omnidirectional camera, and in a case where a detection has been made, changing a display image so that the subject is displayed in a vicinity of a center of the display.

A sixteenth of the present invention provides an omnidirectional camera display image changing system for displaying a captured image captured by an omnidirectional camera on a connected display, the omnidirectional camera display image changing system including a line-of-sight detecting unit that detects that a movement amount of a line of sight of a subject exceeds a predetermined threshold value, in an image of the subject which is specified by performing image recognition on an entire visual field image captured by the omnidirectional camera, and a display image changing unit that, in a case where a detection has been made, changes a display image so that an eye of the subject is displayed in a vicinity of a center of the display.

According to the sixteenth of the present invention, because a display image is changed so that an eye of the subject is displayed in a vicinity of a center of the display when it is detected that a movement amount of a line of sight of the subject exceeds a predetermined threshold value, in an image of the subject which is specified by performing image recognition on an entire visual field image captured by the omnidirectional camera, the place desired by the user can be displayed without many operation inputs. Accordingly, the sixteenth aspect of the present invention can provide a technical solution for displaying the place desired by the user without many operation inputs, thereby improving the convenience of the display image changing system.

A seventeenth of the present invention provides an omnidirectional camera display image changing system for displaying a captured image captured by an omnidirectional camera on a connected display, the omnidirectional camera display image changing system including a motion detecting unit that detects a movement amount of a motion in a body of a subject exceeds a predetermined threshold value, in an image of the subject which is specified by performing image recognition on an entire visual field image captured by the omnidirectional camera, and a display image changing unit that, in a case where a detection has been made, changes a portion of the body in which the movement amount exceeds the predetermined threshold value to a vicinity of a center of the display, adjusts focus on the portion of the body in which the movement amount exceeds the predetermined threshold value, and changes a display image so that the subject is displayed with a moved portion of the body as a center.

According to the seventeenth of the present invention, because a display image is changed so that the subject is displayed with a moved portion of the body as a center when it is detected that a movement amount of a motion in a body of a subject exceeds a predetermined threshold value, in an image of the subject which is specified by performing image recognition on an entire visual field image captured by the omnidirectional camera, the place desired by the user can be displayed without many operation inputs. Accordingly, the sixteenth aspect of the present invention can provide a technical solution for displaying the place desired by the user without many operation inputs, thereby improving the convenience of the display image changing system.

An eighteenth of the present invention provides an omnidirectional camera display image changing system for displaying a captured image captured by an omnidirectional camera on a connected display, the omnidirectional camera display image changing system including a voice detecting unit that detects a volume of a voice of a subject exceeds a predetermined threshold value, in an image of the subject which is specified by performing image recognition on an entire visual field image captured by the omnidirectional camera, and a display image changing unit that, in a case where a detection has been made, changes a position of a mouth of the subject to a vicinity of a center of the display, adjusts focus on the mouth of the subject, and changes a display image so that the subject is displayed with the mouth of the subject as a center.

According to the eighteenth of the present invention, because a display image is changed so that the subject is displayed with the mouth of the subject as a center when it is detected that a volume of a voice of a subject exceeds a predetermined threshold value, in an image of the subject which is specified by performing image recognition on an entire visual field image captured by the omnidirectional camera, the place desired by the user can be displayed without many operation inputs. Accordingly, the sixteenth aspect of the present invention can provide a technical solution for displaying the place desired by the user without many operation inputs, thereby improving the convenience of the display image changing system.

According to an aspect of the present invention, an omnidirectional camera display image changing system, an omnidirectional camera display image changing method, and a program for improving the convenience can be provided.

DETAILED DESCRIPTION OF THE EMBODIMENTS

Hereinafter, embodiments for carrying out the present invention are described with reference to the drawings. It is to be understood that the embodiments are merely examples and the scope of the present invention is not limited to the disclosed embodiments.

Overview of Omnidirectional Camera Display Image Changing System

Figure 1:
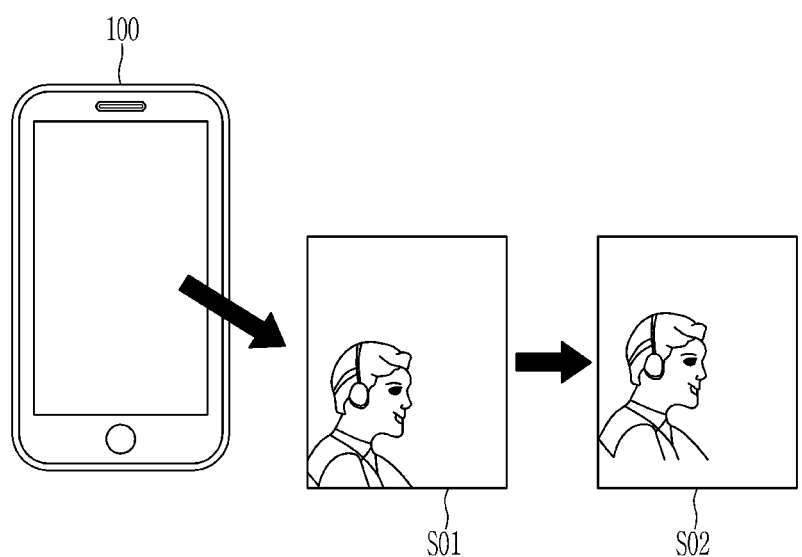
FIG. 1 is a diagram for explaining an overview of the omnidirectional camera display image changing system 1.

An overview of an omnidirectional camera display image changing system according to an embodiment of the present invention is described with reference to FIG. 1. FIG. 1 is a diagram for explaining an overview of the omnidirectional camera display image changing system 1 according to a preferred embodiment of the present invention. The omnidirectional camera display image changing system 1 includes an information terminal 100.

In FIG. 1, the number of information terminal(s) 100 is not limited to one but may be two or more. Further, the information terminal 100 may be realized by either an existing device or a virtual device, or both the existing device and the virtual device.

The information terminal 100 is a terminal device equipped with an omnidirectional camera capable of capturing a 360-degree panoramic photograph in all directions of up, down, right and left directions and capable of displaying the panoramic image on its own display. The information terminal 100 may be, for example, a mobile phone, a portable information terminal, a tablet terminal, a personal computer, an electric appliance such as a netbook terminal, a slate terminal, an electronic book terminal, or a portable music player, a wearable terminal such as a smart glasses worn by an operator or a head mount display, or other goods.

In the following description, it is assumed that the information terminal 100 captures an image of a subject and a periphery of the subject as a panoramic photograph by setting a user as the subject. The information terminal 100 may capture an image of a person other than the user as the subject, or may capture an image of an object or the like other than the person as the subject.

The information terminal 100 captures an entire visual field image with an omnidirectional camera and displays a part of the entire visual field image as a display image on itself (step S01). The information terminal 100 captures an image such as a still image or a moving image.

The information terminal 100 determines whether subject information such as a line of sight, a voice, a motion, or the like of the subject is detected. When the subject information is detected, the information terminal 100 changes a display position in the display image of the subject to the vicinity of the center of the display and displays the changed display image as a changed image (step S02).

The above is the overview of the omnidirectional camera display image changing system 1.

System Configuration of Omnidirectional Camera Display Image Changing System 1

Figure 2:
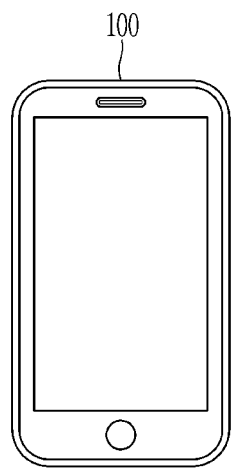
FIG. 2 is a diagram showing an overall configuration of an omnidirectional camera display image changing system 1.

A system configuration of an omnidirectional camera display image changing system 1 is described with reference to FIG. 2. FIG. 2 is a diagram showing a system configuration of an omnidirectional camera display image changing system 1 according to an embodiment of the present invention. The omnidirectional camera display image changing system 1 includes an information terminal 100. The number of information terminal(s) 100 is not limited to one but may be two or more. Further, the information terminal 100 may be realized by either an existing device or a virtual device, or both the existing device and the virtual device.

The information terminal 100 is the above-described terminal device having functions to be described later. The information terminal 100 may be separated from an omnidirectional camera. In this case, the information terminal 100 and the omnidirectional camera may be connected via a wired connection, a short-distance wireless communication, am infrared communication, a public network, or the like. The information terminal 100 executes data communication with the omnidirectional camera and displays an image captured by the omnidirectional camera.

Explanation of Functions

Figure 3:
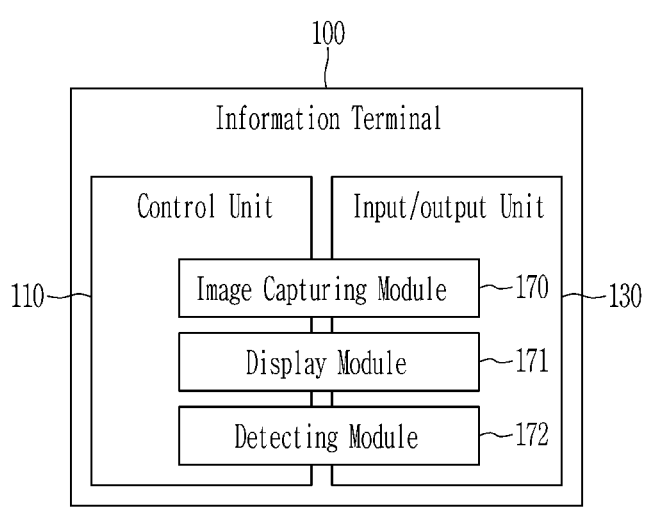
FIG. 3 is a functional block diagram of an information terminal 100.

Functions of an omnidirectional camera display image changing system 1 according to a preferred embodiment of the present invention are described with reference to FIG. 3. FIG. 3 is a functional block diagram of an information terminal 100 in an omnidirectional camera display image changing system according to an embodiment of the present invention.

The information terminal 100 includes, as a control unit 110, a processor such as a CPU (Central Processing Unit), a RAM (Random Access Memory), a ROM (Read Only Memory), and the like, and includes, as a communication unit, a communication device for enabling communication with another device, for example, a WiFi (Wireless Fidelity) compliant device conforming to IEEE 802.11. Further, the information terminal 100 includes, as an input/output unit 130, a display device for outputting and displaying data or images controlled by the control unit 110, an input device such as a touch panel, a keyboard, a mouse, or the like for accepting an input from a user, a detecting device for detecting a line of sight, a motion, or a voice of a subject, an omnidirectional camera for capturing an image of the subject, or the like.

In the information terminal 100, the control unit 110 reads a predetermined program, thereby realizing an image capturing module 170, a display module 171 and a detecting module 172 in cooperation with the input/output unit 130.

Display Image Changing Process

A display image changing process executed by an information terminal 100 is described with reference to FIG. 4.

Figure 4:
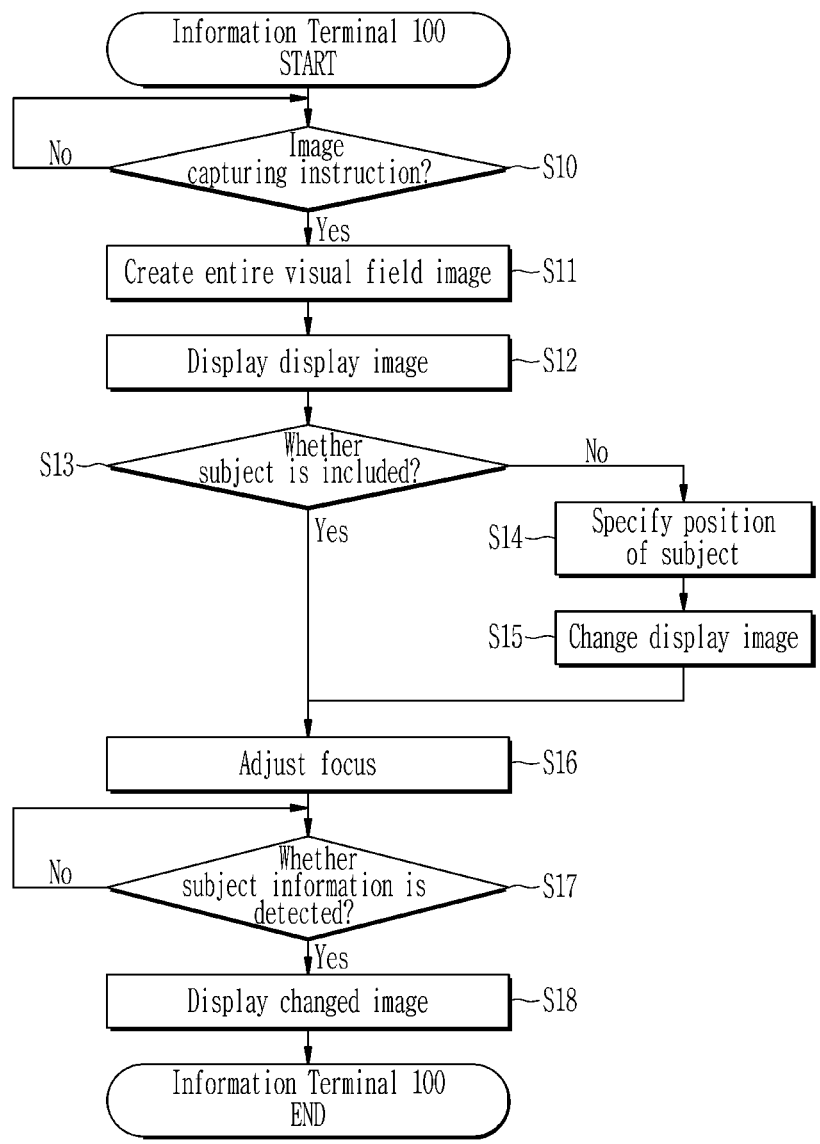
FIG. 4 is a diagram showing a flowchart of a display image changing process executed by an information terminal 100.

FIG. 4 is a diagram showing a flowchart of a display image changing process executed by an information terminal 100 according to an embodiment of the present invention. The processing executed by each module described above is described together with the present processing.

First, an image capturing module 170 determines whether an image capturing instruction from a user is accepted (step S10). In step S10, the image capturing module 170 starts a dedicated application, and determines whether the image capturing instruction is accepted based on whether an input of the image capturing instruction is received, whether an input of an image capturing switch is accepted or the like. In step S10, when the image capturing module 170 determines that the image capturing instruction is not accepted (NO in step S10), the image capturing module 170 repeats this processing.

On the other hand, when it is determined in step S10 that the image capturing instruction is accepted (YES in step S10), the image capturing module 170 captures an entire visual field and creates an entire visual field image (step S11). The image capturing module 170 captures an image such as a moving image or a still image. In step S11, the entire visual field image may be created by capturing a plurality of omnidirectional images from a certain point and combining the captured images.

A display module 171 displays a specific region of the captured entire visual field image as a display image (step S12). In step S12, the display module 171 may display a predetermined region of the entire visual field image as the specific region. In addition, the display module 171 may recognize a subject that is a user by performing image recognition on the entire visual field image, and display an entire image of the user as the specific region. Furthermore, the display module 171 may display the display image by other methods.

The display module 171 determines whether the subject is included in the display image (step S13). In step S13, the display module 171 performs image recognition on the display image to determine whether the subject exists in the display image. A person other than the user, an object or the like may be the subject.

In step S13, when the display module 171 determines that the subject is not included (NO in step S13), the display module 171 performs the image recognition on the entire visual field image to specify a position of the subject (step S14).

The display module 171 changes the display image by rotating the current display image so that the entire image of the specified subject is displayed in the vicinity of its center (step S15). In step S15, "rotating" means to move the current display image so that the entire image of the subject is positioned at the vicinity of the center. In step S15, the display image may be changed by a method other than rotation, for example, movement of the display position. Further, it may be changed by other methods.

The display module 171 focuses on the subject in the changed display image (step S16). The processing of step S16 may be omitted.

On the other hand, when it is determined in step S13 that the subject is included (YES in step S13), the display module 171 focuses on the subject (step S16). The processing of step S16 may be omitted.

The detecting module 172 determines whether subject information such as a line of sight, a motion, a voice or the like of the subject is detected (step S17). In addition, in step S17, the detecting module 172 may determine that the subject information is detected when the subject information exceeds a predetermined threshold value, and may determine that the subject information is not detected when the subject information does not exceed the predetermined threshold value. For example, the detecting module 172 may set the threshold value to a movement amount of the line of sight or motion, a volume of the voice or the like, and detect that the subject information is detected when the movement amount or the volume of the voice exceeds the threshold value. Further, the threshold value may be of other types other than the above-described types, and the type and amount may be appropriately changed.

A case where the line of sight of the subject is detected in step S17 is described. The line of sight of the subject indicates the movement of the line of sight of the subject and the movement amount. The detecting module 172 specifies positions of an inner corner of an eye and an iris in the image-recognized subject. The detecting module 172 detects the line of sight of the subject based on the specified positions of the inner corner of the eye and the iris. In addition, the detecting module 172 specifies positions of a corneal reflection and a pupil by an infrared camera and an infrared LED. The detecting module 172 detects the line of sight of the subject based on the specified positions of the corneal reflection and the pupil. The detecting module 172 may detect the line of sight of the subject by other methods.

Further, a case where the motion of the subject is detected in step S17 is described. The motion of the subject means a specific movement of a part or the whole of the body of the subject. The detecting module 172 specifies the movement of the part or the whole of the body in the image-recognized subject. The movement of the part or the whole of the body may be, for example, moving a hand up, moving the hand down, directing a finger upward, directing the finger downward, turning a head up, turning head downward, or turning the whole body back. The motion is not limited to the above-described examples, but may be another motion or a combination of a plurality of motions.

In addition, a case where the voice of the subject is detected in step S17 is described. The voice of the subject indicates a voice uttered by the subject. The detecting module 172 performs speech recognition on the voice of the subject input through a voice input device such as a microphone and detects the voice.

In step S17, when the detecting module 172 determines that subject information is not detected (NO in step S17), the detecting module 172 repeats this processing.

On the other hand, in step S17, when the detecting module 172 determines that the subject information is detected (YES in step S17), the display module 171 changes the display image so that the subject is displayed in the vicinity of its center, and changes focus to the subject and displays it (step S18). In step S18, the display module 171 executes the change of the display image by rotating or moving a corresponding portion of the entire visual field image. "Rotating" means to move the displayed image by a predetermined angle in one direction around a certain point. In addition, "moving" means to move the displayed image in a predetermined direction. In step S18, the vicinity of the center of a screen indicates the center of the screen or near the center of the screen, and does not need to be the center of the screen. The display module 171 may not focus on the subject in the changed image.

A case where the detecting module 172 detects the line of sight of the subject in step S18 is described. When the detecting module 172 detects the line of sight of the subject in step S17, the display module 171 displays the changed image in which the position of the eye of the subject is set at the vicinity of the center of the screen.

Figure 5:
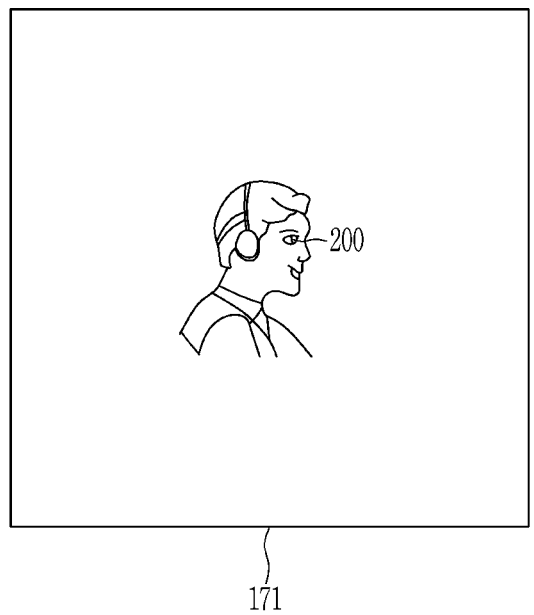
FIG. 5 is a diagram showing a changed image displayed by an information terminal 100.

FIG. 5 is a diagram showing a changed image displayed by a display module 171. In FIG. 5, the display module 171 changes a position of an eye 200 of the subject to a position of a center of an image display area which the display module 171 is capable of displaying, focuses on the whole subject, and displays the changed image in the image display area by setting the eye 200 of the subject to the center. The display module 171 may focus on the eye 200 of the subject not the whole subject. In addition, the display module 171 may focus on an object other than the subject.

A case where the detecting module 172 detects the motion of the subject in step S18 is described. When the detecting module 172 detects the motion of the subject in step S17, the display module 171 displays the changed image in which a position of a moved portion of the subject is set at the vicinity of the center of the screen.

Figure 6:
FIG. 6 is a diagram showing a changed image displayed by an information terminal 100.

FIG. 6 is a diagram showing a changed image displayed by a display module 171. In FIG. 6, the display module 171 changes a position of a hand 300 of the subject at a center position of the image display area, focuses on the whole subject, and displays the changed image in the image display area by setting the hand 300 of the subject to the center. The display module 171 may focus on the hand 300 of the subject not the whole subject. In addition, the display module 171 may focus on an object other than the subject.

A case where the detecting module 172 detects the voice of the subject in step S18 is described. When the detecting module 172 detects the voice of the subject in step S17, the display module 171 displays the changed image in which a position of a mouth of the subject is set at the vicinity of the center of the screen.

Figure 7:
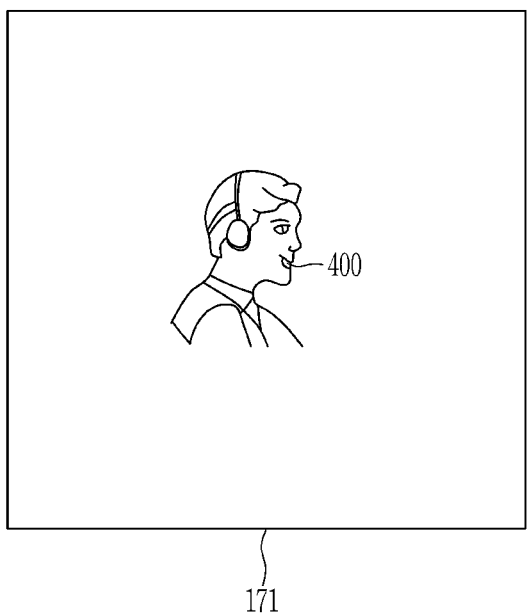
FIG. 7 is a diagram showing a changed image displayed by an information terminal 100.

FIG. 7 is a diagram showing a changed image displayed by a display module 171. In FIG. 7, the display module 171 changes a position of a mouth 400 of the subject at a center position of the image display area, focuses on the whole subject, and displays the changed image in the image display area by setting the mouth 400 of the subject to the center. The display module 171 may focus on the mouth 400 of the subject not the whole subject. In addition, the display module 171 may focus on an object other than the subject.

The above is the display image changing process.

According to an embodiment of the present invention, because a display image is changed so that the subject is displayed with the eye, hand, or mouth of the subject as a center when it is detected that the movement amount of the line of sight or motion of the hand, or a volume of the voice exceeds a predetermined threshold value. Accordingly, the place desired by the user can be displayed without many operation inputs so that the convenience of the display image changing system can be improved.

The means and functions described above are realized by reading and executing a predetermined program by a computer (including a CPU, an information processing device, or various terminals). The program is provided, for example, in a form recorded in a computer-readable recording medium such as a flexible disk, a CD (e.g., CD-ROM or the like), a DVD (DVD-ROM, DVD-RAM, or the like), or the like. In this case, the computer reads the program from the recording medium and transfers the program to an internal storage unit or an external storage unit so as to be stored and executed. Furthermore, the program may be, for example, recorded in a storage device (recording medium) such as a magnetic disk, an optical disk, an optical magnetic disk, or the like in advance and be provided from the recording medium to the computer through a communication line.

While the embodiments of the present invention have been described above, the present invention is not limited to the above-described embodiments. In addition, the effects described in the embodiments of the present invention are merely a list of the most preferable effects produced by the present invention, and the effects of the present invention are limited to those described in the embodiments of the present invention.

DESCRIPTION OF REFERENCE NUMBERS

1: omnidirectional camera display image changing system, 100: information terminal

What is claimed is:

1. An omnidirectional camera display image changing system for displaying a captured image captured by an omnidirectional camera on a connected display, the omnidirectional camera display image changing system comprising:
 a detecting device; and
 a processor that:
  detects, by using the detecting device, that a movement amount of a line of sight of a subject exceeds a predetermined threshold value, in an image of the subject which is specified by performing image recognition on an entire visual field image captured by the omnidirectional camera; and
  in a case where a detection has been made, changes a display image so that an eye of the subject is displayed in a vicinity of a center of the display.

2. The omnidirectional camera display image changing system according to claim 1, wherein the processor rotates the captured image of the omnidirectional camera to change the display image.

3. An omnidirectional camera display image changing method for displaying a captured image captured by an omnidirectional camera on a connected display, the omnidirectional camera display image changing method comprising:
 detecting that a movement amount of a line of sight of a subject exceeds a predetermined threshold value, in an image of the subject which is specified by performing image recognition on an entire visual field image captured by the omnidirectional camera; and
 in a case where a detection has been made, changing a display image so that an eye of the subject is displayed in a vicinity of a center of a display.

4. A non-transitory computer-readable recording medium that stores a program for causing an omnidirectional camera display image changing system for displaying a captured image captured by an omnidirectional camera on a connected display to execute:
 detecting that a movement amount of a line of sight of a subject exceeds a predetermined threshold value, in an image of the subject which is specified by performing image recognition on an entire visual field image captured by the omnidirectional camera; and
 in a case where a detection has been made, changing a display image so that an eye of the subject is displayed in a vicinity of a center of a display.

* * * * *